US008549520B2

(12) United States Patent
Stoitsev et al.

(10) Patent No.: US 8,549,520 B2
(45) Date of Patent: Oct. 1, 2013

(54) DISTRIBUTED TASK HANDLING

(75) Inventors: Todor Stoitsev, Darmstadt (DE); Stefan Scheidl, Dieburg (DE)

(73) Assignee: SAP AG, Walldorf (DE)

( * ) Notice: Subject to any disclaimer, the term of this patent is extended or adjusted under 35 U.S.C. 154(b) by 1083 days.

(21) Appl. No.: 11/831,507

(22) Filed: Jul. 31, 2007

(65) Prior Publication Data

US 2009/0037912 A1 Feb. 5, 2009

(51) Int. Cl.
*G06F 9/46* (2006.01)

(52) U.S. Cl.
USPC ........................................ 718/100; 717/101

(58) Field of Classification Search
USPC .................................. 717/101, 103; 718/100
See application file for complete search history.

(56) References Cited

U.S. PATENT DOCUMENTS

| 7,051,036 | B2* | 5/2006 | Rosnow et al. | 707/723 |
|---|---|---|---|---|
| 2003/0051230 | A1* | 3/2003 | Molchanov et al. | 717/120 |
| 2004/0078373 | A1* | 4/2004 | Ghoneimy et al. | 707/10 |
| 2004/0221256 | A1* | 11/2004 | Martin et al. | 717/101 |
| 2006/0070019 | A1* | 3/2006 | Vishnumurty et al. | 717/101 |
| 2007/0074211 | A1* | 3/2007 | Klug | 718/100 |
| 2008/0034015 | A1* | 2/2008 | Behnen et al. | 707/204 |
| 2008/0115131 | A1* | 5/2008 | Kelsey et al. | 718/100 |
| 2008/0172400 | A1* | 7/2008 | Koronthaly | 707/100 |
| 2008/0209417 | A1 | 8/2008 | Jakobson | |
| 2008/0313281 | A1 | 12/2008 | Scheidl et al. | |

OTHER PUBLICATIONS

"U.S. Appl. No. 11/831,507, Preliminary Amendment mailed Aug. 30, 2007", 8 pgs.

"European Application Serial No. 07011575.3, Extended European Search Report mailed Nov. 13, 2008", 3 pgs.

"European Application Serial No. 07011575.3, Response filed Feb. 5, 2009 to Extended European Search Report mailed Nov. 13, 2008", 28 pgs.

Agostini, Alessandra, et al., "Rethinking CSCW systems: the architecture of Milano", Cooperation Technologies Laboratory, DSI-University of Milano, Italy, (1997).

Stoitsev, Todor, et al., "A Framework for Light-Weight Composition and Management of Ad-Hoc Business Processes", *Lecture Notes in Computer Science. Springer Berlin / Heidelberg, vol. 4849*, (Nov. 7, 2007), 213-226.

Duursma, Cuno, et al., "Task Model Definition and Task Analysis Process. KADS-II, Deliverable M.5, Verison 2.0", *Vrije University, Brussels KADSII/M5/VUB/RR/004/2.0*, (Aug. 8, 1994),1-51.

Grebner, O., et al., "Task Management Model", *The Social Semantic Desktop Nepomuk*, (2007), 1-91.

Mori, G., et al., "CTTE: Support for Developing and Analyzing Task Models for Interactive System Design", *IEEE Transactions on Software Engineering*, 28(9), (Sep. 2002), 1-17.

Oudshoorn, Michael J., et al., "Conditional Task Scheduling on Loosely-Coupled Distributed Processors", *The 10th International Conference on Parallel and Distributed Computer Systems*, The International Society for Computers and Their Applications. New Orleans, USA,(1997), 136-140.

(Continued)

*Primary Examiner* — Diem Cao
(74) *Attorney, Agent, or Firm* — Schwegman Lundberg & Woessner, P.A.

(57) ABSTRACT

Various embodiments described herein provide systems, methods, software, and data structures that may be used in distributed task handling. Some embodiments include a generic architecture for loosely coupled associations of globally managed tasks and artifacts within user defined task descriptions. As a result, such embodiments provide a flexible and adaptable task model.

11 Claims, 10 Drawing Sheets

(56) References Cited

OTHER PUBLICATIONS

Sinnig, Daniel, et al., "Patterns, Tools and Models for Interaction Design", MBUI 2004, *Proceedings of the First International Workshop on Making model-based user interface design practical: usable and open methods and tools*, 103, Funchal, Madeira, Portugal,(2004),1-4.

"U.S. Appl. No. 12/137,401, Response filed May 31, 2011 to Restriction Requirement mailed May 5, 2011", 8 pgs.

"U.S. Appl. No. 12/137,401, Restriction Requirement mailed May 5, 2011", 4 pgs.

"U.S. Appl. No. 12/137,401, Non Final Office Action mailed Aug. 22, 2011", 7 pgs.

"U.S. Appl. No. 12/137,401, Final Office Action Mailed Dec. 12, 2011", 6 pgs.

"U.S. Appl. No. 12/137,401, Response filed Nov. 22, 2011 to Non Final Office Action mailed Aug. 22, 2011", 12 pgs.

\* cited by examiner

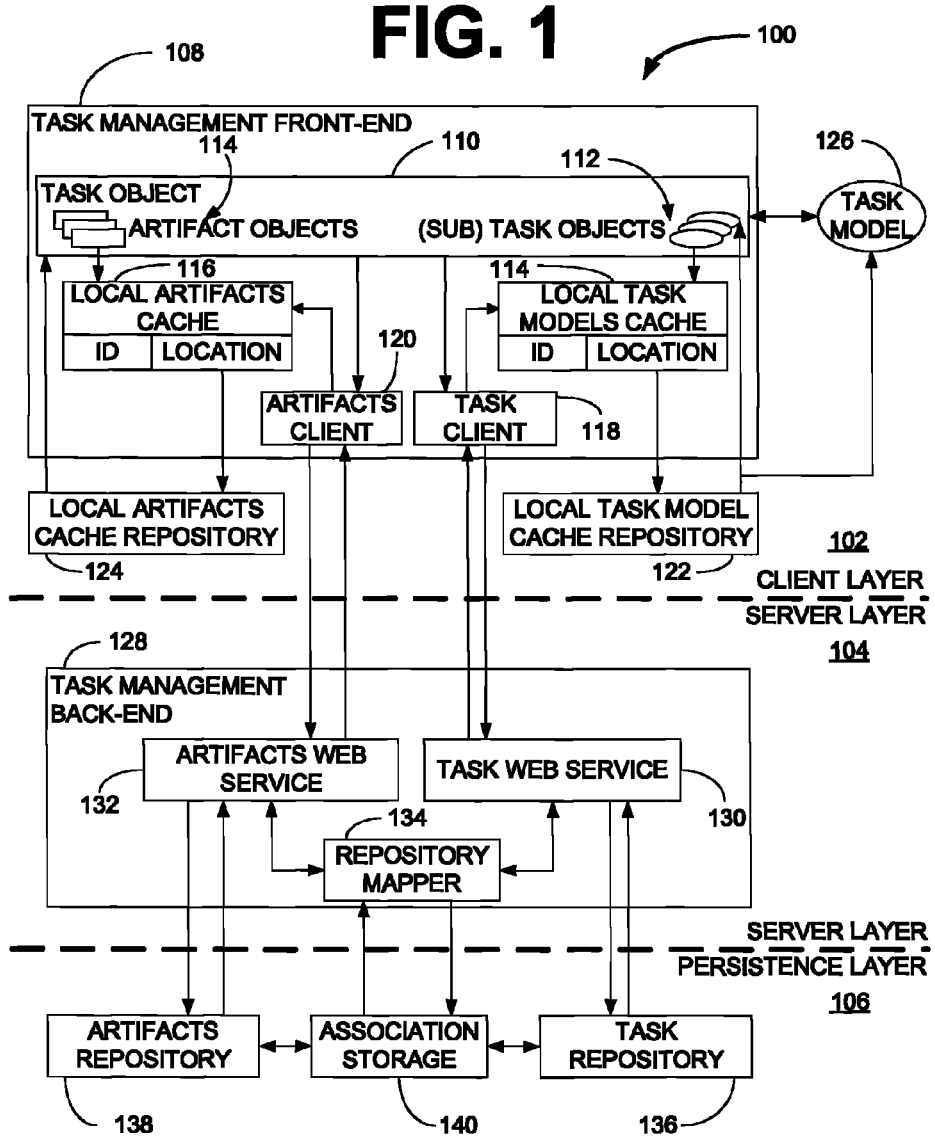

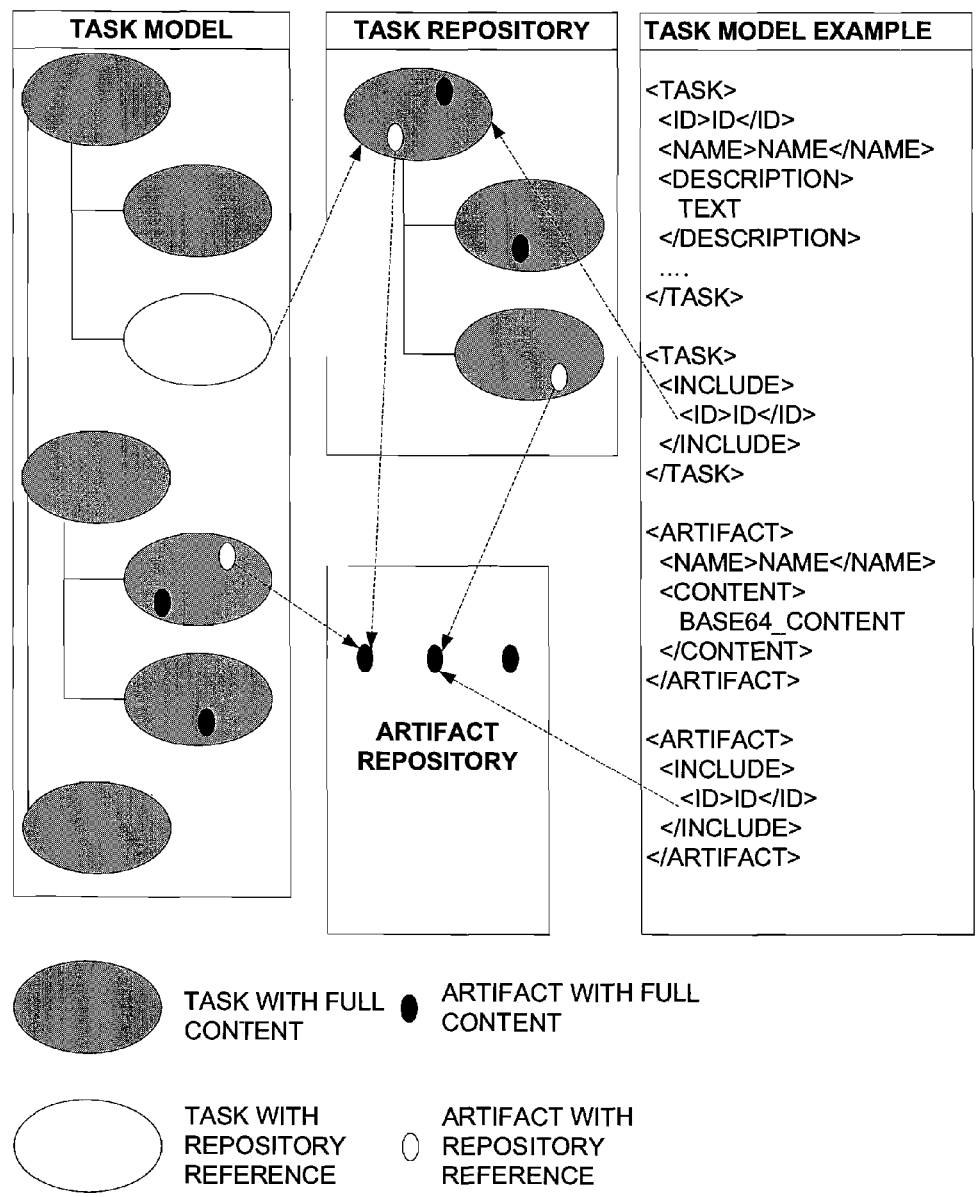

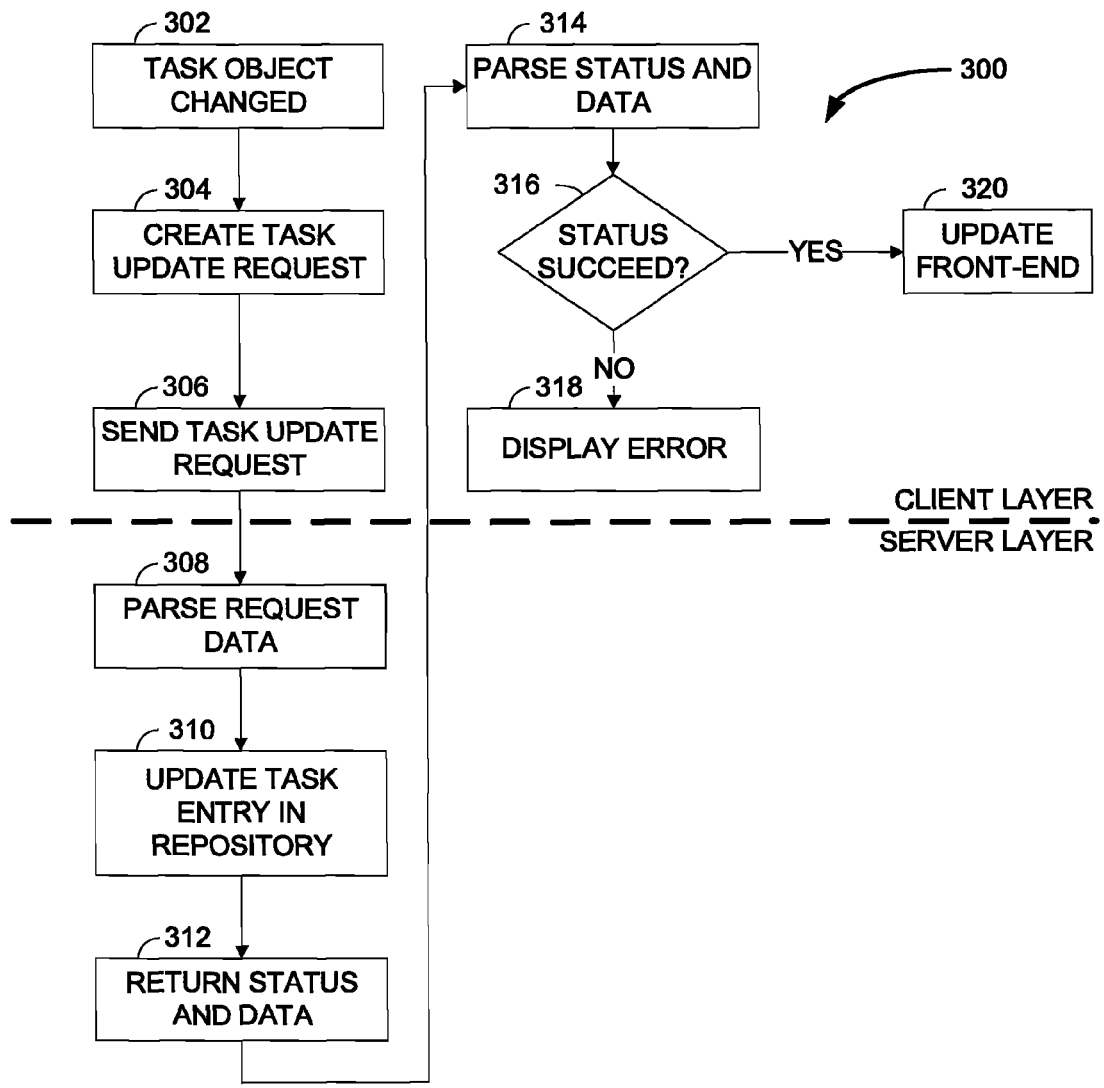

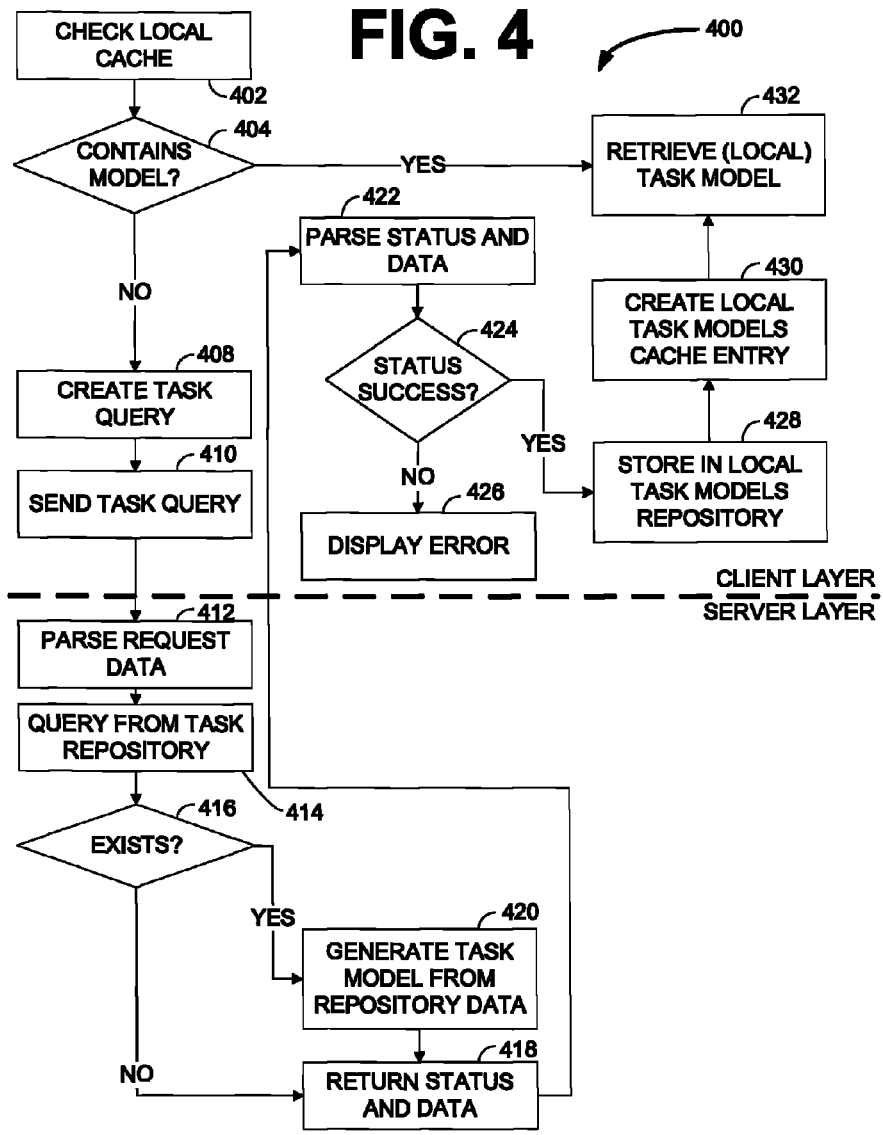

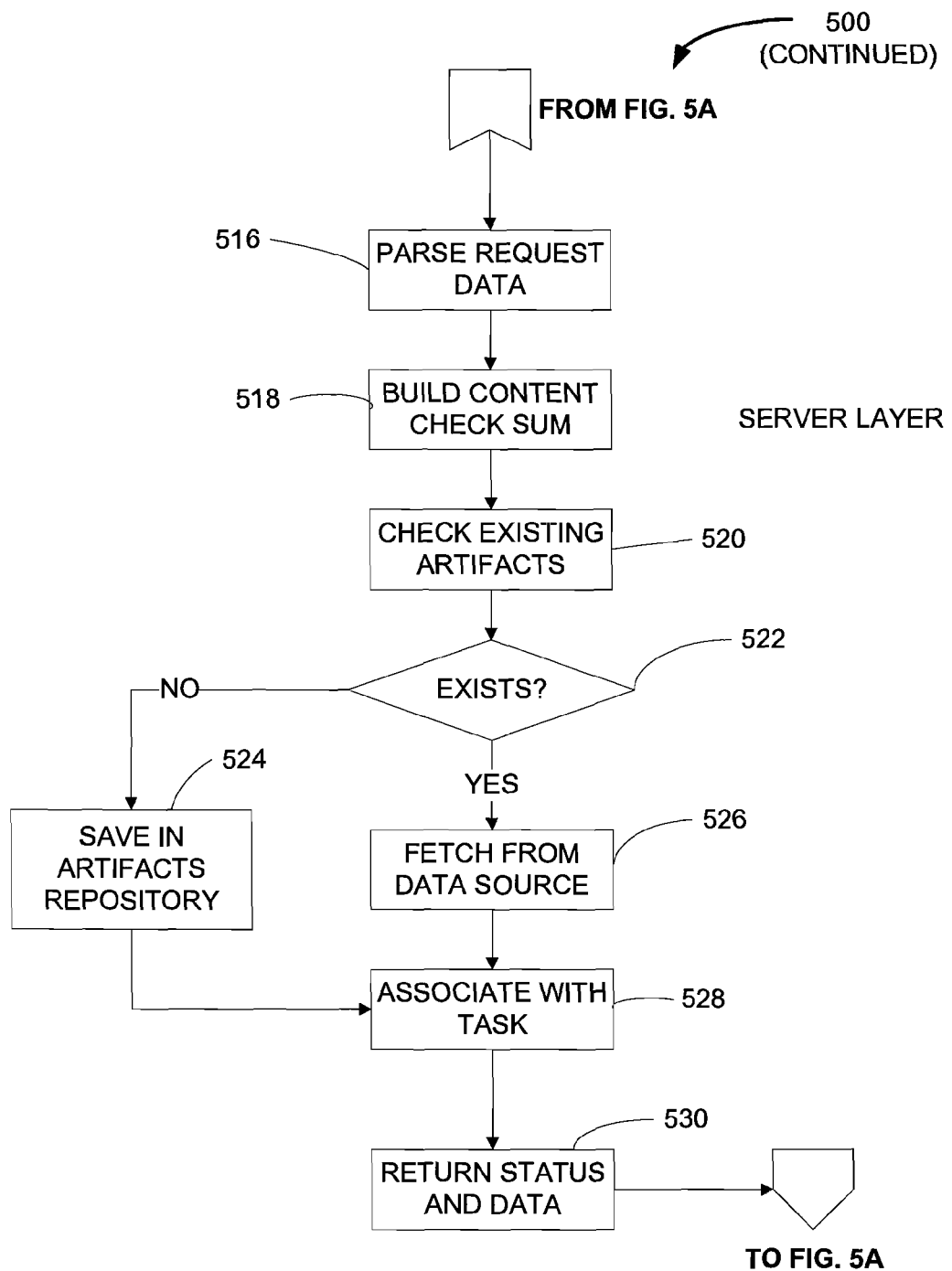

DISTRIBUTED TASK HANDLING

BACKGROUND INFORMATION

Internal processes of organizations are commonly tracked using task or project management software. Such software allows modeling of projects and task. These models are typically static. However, operations within many organizations utilize loosely defined or dynamic processes that may change in an unpredictable fashion.

At the same time, such task and project management software are delivered in standalone applications with little integration with other software tools. As a result, users of task and project management software have had to undergo application specific training which can be costly and time consuming. Further, if training is not offered, the users are left to their own to figure out how to use the software. Although the task and project management software is used in some organizations, as a result of the static nature of the software, use remains siloed to specific project types, such as software development and engineering.

Further, project or task files of such software applications generally have utilized a data structure per project format. For there to be multiple instances of a project file, the project file must be replicated multiple times. As a result, files for projects can become quite large. Synchronizing between project file instances also becomes an issue. Further, if an organizational process that is a part of multiple projects is modified, each project file must be changed individually.

BRIEF DESCRIPTION OF THE DRAWINGS

FIG. 1 is a logical block diagram of a system according to an example embodiment.

FIG. 2 is a logical data relation diagram of a task model according to an example embodiment.

FIG. 3 is a block flow diagram of a method according to an example embodiment.

FIG. 4 is a block flow diagram of a method according to an example embodiment.

FIG. 5B is a block flow diagram of a second portion of the method of FIG. 5A according to an example embodiment.

DETAILED DESCRIPTION

Figure 5A:
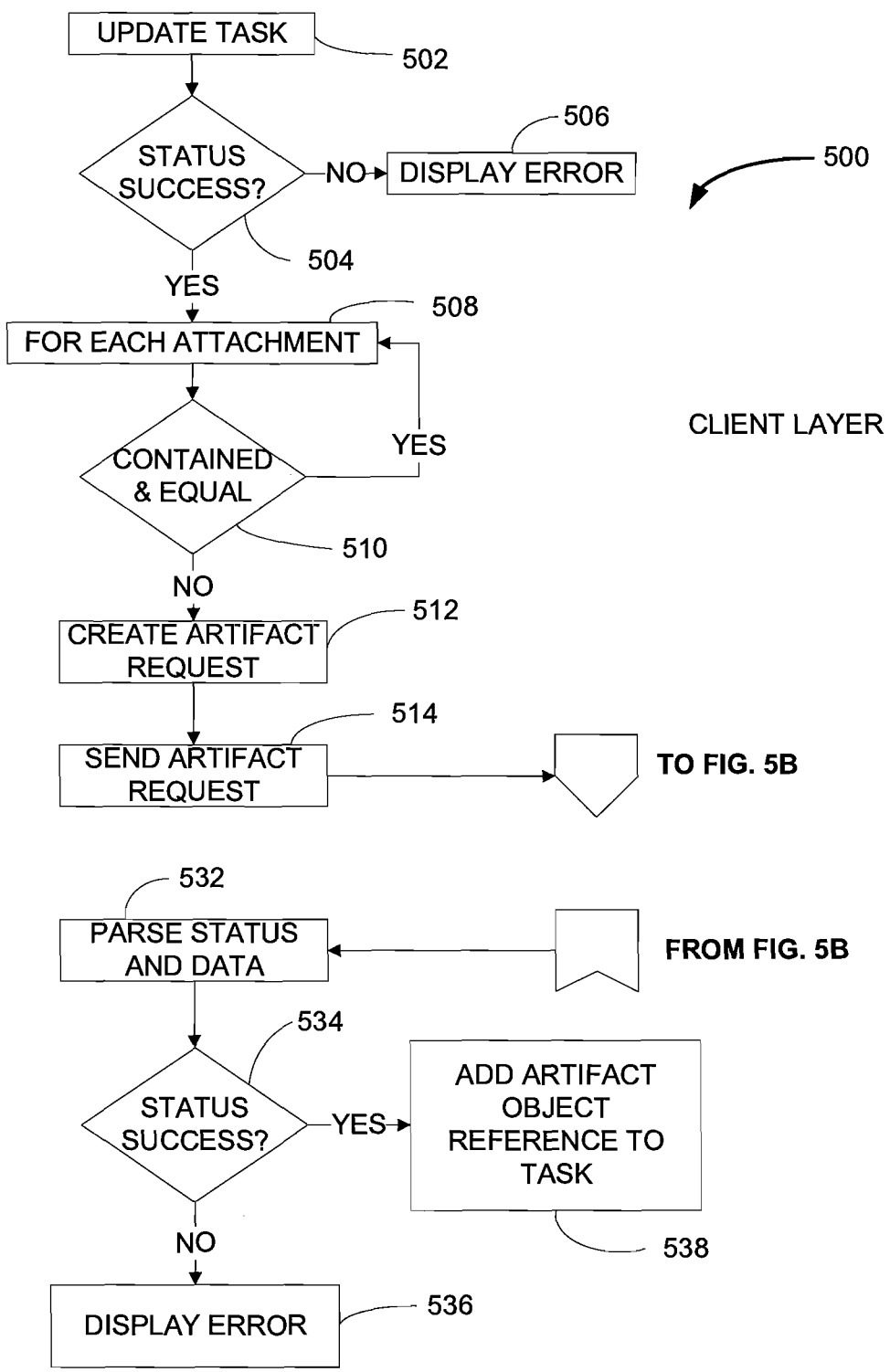
FIG. 5A is a block flow diagram of a first portion of a method according to an example embodiment.

People often deal with tasks in their everyday work practices. A task is generally a self contained unit of work. The subject matter herein provides various embodiments that may include one or more of systems, software, methods, and data structures to define, store, and manage tasks.

Task structures emerging from individual work may often relate to globally accepted business practices and processes which may be dictated on an organizational level. The various embodiments herein provide mechanisms by which tasks may be defined and modified without disruption or adverse effects to ongoing organizational operations. Some such embodiments utilize shared task structures and artifacts, such as documents and templates, that are used as building blocks for larger tasks. Modifying one task, which may be a subtask of a larger task, or an artifact, which may be shared with another task or subtask, causes the modification to be automatically made to the larger task. Such modifications may be made to processes of defined tasks or to artifacts, such as documentation, that accompanies a task definition. Various embodiments described herein provide a generic architecture for loosely coupled associations of globally managed tasks and artifacts within user defined task descriptions. This results in a task model, which provides flexible and adaptable task structures. These and other embodiments are described in greater detail below.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application specific integrated circuit. Thus, the exemplary process flow is applicable to software, firmware, and hardware implementations.

Relation of globally managed tasks is provided in some embodiments through inclusion of unique task identifiers, pointing to the globally managed task structures in a central repository. Thereby the globally managed task structures may be retrieved on demand in their latest form—as they are currently described in the repository.

Artifact representations, in some embodiments, are manageable through software in parallel to task structures. The parallel artifacts system typically is able to deliver and associate different artifacts and different versions of the same artifact from a central artifacts repository to one or more task models, based on the minimal artifact representation included in the task model.

The architecture for the management of the above stated representation typically consists of some or all of eight building blocks:

The task model (description);

A client side application, which is able to create new task structures and read out existing ones from a back-end system by associating documents to them;

A client side task models local cache repository serving for optimization purposes by storing locally once retrieved globally managed task models. The local task models cache repository is optional as it is typically included to increase client responsiveness;

A client side artifacts local cache repository serving for optimization purposes by storing locally once retrieved artifacts. The local cache repository is optional as it is typically included to increase client responsiveness;

A server application containing central task and artifact management services. The latter are responsible for the storage, association, and delivery of task and artifact structures in a centralized manner for multiple clients utilizing the client side application;

A task repository on server side holding managed task models and data for the tasks created from various users;

An artifacts repository on the server side serving as a central artifacts storage mechanism for the distributed model; and Association storage holding data for the mapping of artifacts to tasks.

Examples for the other above stated elements may include: XML document as task model description, a groupware add-in application, which makes use of groupware tasks with attachments and provides web service clients for transmission of task and attachment contents, a java application server exposing web services for task and artifact management with a database as the data store. The database typically includes:

Task tables—holding data for the globally managed task models and for task structures created by users;

Artifact tables—holding artifact attributes and containing pointers to physical server side files, which hold the artifacts content; and Artifact-Task tables, constructed as foreign key tables from the join of artifacts and task data and thereby implementing the artifacts associations to tasks.

In typical embodiments, users create tasks in a groupware application and add attachments to the tasks with default groupware functionality. When the tasks are saved, the task structure is read out and transmitted to the back-end for persistence over a web service. The latter creates task entries in the task repository and thereby creates a central back-end task instance for the passed task. After the task structure is persisted the front end reads out all attachments for the task and transmits them to the back-end over an artifact management web service (e.g. over Simple Object Access Protocol or "SOAP").

Artifacts are typically stored in the artifacts repository on the server, whereby each available artifact with the same name is explicitly checked according to a checksum so that no duplicates are created for already existing artifacts. A unique ID is generated for each artifact and tasks using the artifact are associated to the artifact through their task ID and the artifact ID. Note that both task transmission and task attachment transmission may be performed using a single web service, thereby it may only be important to store the attachments after a task has been created so that the association can be made correctly. Also, the task and artifact web services may be provided on physically different hosts.

In some embodiments, when the artifact management service stores the attachments, the artifact management service returns an ID to the client front-end, which uniquely identifies the persisted artifact on the back end. Thereby all clients may use the same artifacts service to make sure the attachments are identified correctly but if an advanced identification scheme is elaborated, the client may make use of clustered artifacts services where the artifacts repository is distributed over multiple hosts. The ID returned from the server may then be stored in the task structures on the client front end. If a user exports a task model from an existing task in the client front-end, a reference to the appropriate artifacts is typically exported in the task model through the artifact ID. Each user which applies the generated task model is then able to query the artifact with this ID and obtain it from the artifacts server. The above described proceeding refers to personal task creation, executed by each system user. Thereby users with specific roles can create task structures, which are accepted as common practices in an enterprise. The created task structures comply with the above described proceeding and are globally accessible through their task ID. Other users may then refer to these globally managed tasks through their ID and include these tasks in their personal process models.

FIG. 1 is a logical block diagram of a system 100 according to an example embodiment. The architecture of the system 100, as mentioned above, may include some or all of eight building blocks. These building blocks are spread across a client layer 102, a server layer 104, and a persistence layer 106. In the client layer 102 is a task model 126 abstraction, a task management front-end application 108, a task model local cache repository 114, and a local artifacts cache repository 116. In the server layer is a task management back-end application 128. In the persistence layer is a task repository 136, an artifacts repository 138, and an association storage 140.

The task model 126 abstraction typically provides an abstracted, standardized task description. The front-end application 108 manages the task and artifact structures locally for each client and issues update and query requests to the back-end application 128. The backend application 128 provides centralized services for task and artifact management. The task model 126 provides a format in which tasks are stored locally and transmitted between the client layer 102 and server layer. Tasks may be represented in an XML format to transmit task data between the client and server layers 102, 104.

The front-end application 108 contains several elements including some or all of the task object runtime representation 110, the artifacts client 120, the tasks clients 118, a local artifact cache component 116, and a local task model cache component 114. The task client 118 transmits updates to task objects to the back-end application 128 and queries task structures managed in the server layer 104 and stored in the persistence layer 106. The artifact client 120 transmits updates to artifacts and queries artifacts content managed in the server layer 104 and stored in the persistence layer 106.

In some embodiments, the artifacts client 120 and task client 118 interface with server layer utilizing web services of the task management backend application 128. The web services may include one or more task web services 130 and one or more artifacts web services 132.

The local task models cache 114 typically provides on-demand local storage of globally managed task models as these might have increased size and repeated retrieval from the server layer 104 may cause excessive communication overhead. The local task models cache 114 associates queried models, which are stored in the local task model repository 122, to a unique ID and makes the model content locally available.

The local artifacts cache 116 typically provides on-demand local storage of artifacts as these might have large size and repeated retrieval of them from the server layer 104 may cause excessive communication overhead. The local artifacts cache 116 associates queried artifacts, which are stored in a local cache repository 124, to a unique identifier and makes their content locally available.

However, the local task models cache 114 and local artifacts cache 116 are not required, but are optional. When omitted, the artifacts and task models content is retrieved each time when requested from the server layer 104.

The task management server application 128 typically provides web services for task and artifacts management. These services exist in parallel and manage tasks and artifacts respectively by communicating with clients and executing updates and queries. The task web service 130, in some embodiments, updates the task descriptions delivered from the client layer task management front-end application 108 in a task repository 136 of the persistence layer 106. As the updates are performed through development of tasks in the task management front-end application 108, globally managed task models may be described simply as tasks, which are created and managed by special parties, such as by users with specific roles or functions. Examples of such roles or functions may include administrator, project manager, team lead, and the like. These roles or functions typically provide such people with privileges to create, update, and delete some or all of the globally managed tasks and associated artifacts.

The artifact content for updates is transmitted from the client layer 102 task management front-end application 108 and stored in the artifacts repository 138 of the persistence layer 106 through the artifact web service 132 of the task management back-end application 128 of the server layer 104. In some embodiments, artifact contents are checked based on a checksum to help prevent creation of artifacts with duplicate content.

Associations of artifacts to tasks are made using a repository mapper 134. The repository mapper 134 has the function to map artifact descriptions from the artifact repository 138 to task descriptions in the task repository 136. The mappings are then persisted in the association data storage 140 of the persistence layer 106. These associations may then be read out again by the repository mapper and retrieved back to the task web service 130 and artifacts web service 132.

The task model 126 is an abstracted, standardized representation of a task, which can be exchanged between instances of the task management front-end application 108 in use by different users. FIG. 2 is a logical data relation diagram of a task model 126 according to an example embodiment. The task model is physically a tree-like structure, which can be described in a markup language, such as in an XML document (See Task Model Example of FIG. 2). A task object 126 within the task management front-end application 108 holds a reference to the complete artifact content stored locally, such as an attachment in an groupware application task item, whereas the task model resulting from that object may hold only a reference to the globally stored artifact e.g. an artifact ID. Thereby the physical content of the artifact is not necessarily contained in the task model 126 but resides in the task management back-end application 128 or in the artifacts repository 138 and can be delivered through the artifact web service 132. The task model 126 maybe exported from task objects, existing in the task management front-end application 108. The model format may also be used as a format for delivery of task structures from the server layer 104 or persistence layer 106.

The illustration of FIG. 2 shows one example design of the task model with an example task model on the right according to some embodiments. The task structure is typically in a tree like document structure, where each task may have subtasks and specific characteristics described in appropriate XML tags. Thereby contents of tasks may be contained explicitly or marked for inclusion from the task repository 136.

In some embodiments, the task repository 136 may be file system based, where each task is described in a separate document. In other embodiments, the task repository may be implemented as database tables holding the task content. In database embodiments, the database facilitates searching for unique identifiers of included tasks, such as by task ID. However, unique identification of included tasks may also be performed using a 'name' and 'version' attribute if these are maintained appropriately and can equally deliver a unique identifier constraint.

Apart from inclusion of tasks, the model 126 is useful for the inclusion of artifact content as artifacts are documents and other attachments, which could have large size. The artifacts inclusion will retrieve the artifacts from an artifact repository 138. The artifacts repository 138, in various embodiments, may be constituted from physical files on a server file system or database entries holding all artifact characteristics and the physical file location on the server file system. The search for the artifacts in the artifacts repository 138 utilizing the artifacts web service 132. However, in some embodiments, if desired and specified when an artifact is defined or modified, the complete artifact content may be included in a task model, such as by embedding base64 encoded binary data in the task model.

Task models 126 may be retrieved simply as task description documents, such as the task model example of FIG. 2, for tasks contained in the task repository 136. Thereby different retrieval modes may be selected. For example, a minimal mode may retrieve the task only with inclusion tags. Alternatively, a maximal mode may retrieve the complete content of globally managed tasks and artifacts to the task management front-end application 108. In some embodiments, combinations may also be specified, such as retrieving full task models and a minimum portion of artifact models.

A task object is a runtime representation of the task in the task management front-end application 108. Task objects may be exported in task model 126 documents, such as in the task model example of FIG. 2. A task object, in typical embodiments, holds a reference to the complete artifact content stored locally. However, the task model resulting from a task runtime object may hold only a reference to the globally stored artifact. Artifact references are represented within the task object as artifact objects. Artifact objects are created based on the result of the task content update in the server layer 104 and persistence layer 106. Thereby each contained artifact object corresponds to one task attachment. The artifact objects are used to export the artifact references to the task model. Thereby the physical content of the artifact is by default not contained in the task model but resides in the persistence layer 106 and can be delivered through the artifact web service 132. If desired, the complete content of the artifact may be exported within the task model 126.

The task runtime objects may also contain references to runtime subtask objects. A task object and subtask object are essentially identical, in typical embodiments, except that a task object may reference one or more subtask objects or a subtask object may reference a parent task object. These objects may be filled completely with all relevant task description data or they may only represent partially filled task objects, which are stored on the back end as globally managed task models. The complete content is typically retrieved upon request from the back end, such as when a task node referring to a globally managed task model is expanded in a task tree and all relevant information is to be displayed.

The task client 118 of the task management front-end application 108 is responsible for transferring the local task structures to the task management back-end application 128 and retrieving existing task structures from the task management back-end application 128. Task structures are typically retrieved from the task management back-end application 128 in a well defined task model description. The task client 118 may also be used to update the local task model cache repository 122 if the particular embodiment includes one.

The artifact client 120 of the task management front-end application 108 is responsible for delivering artifacts, which conceptually are task model attachments, to the task management back-end application 128 and retrieving artifacts from the task management back-end application 128. The artifacts client 120 is typically utilized when changes to task attachments are submitted to update the back end artifacts repository 138. The artifacts client 120 may also be used to update the local artifacts cache repository 124 if the particular embodiment includes one.

In some embodiments, the local task models cache 114 is used to store requested task models locally on demand. When a task model is requested from the client, such as when the client wants to view a globally managed task in a displayed task model and double clicks on a task tree node, the local task models cache 114 checks if such a task model exists locally and if not issues a request using the task client to the task web service 130 of the task management back-end application 128. The complete task model is then delivered and stored locally in the local task model cache repository 133. Thereby the local task models cache 114 links a unique model root task identifier of the retrieved task model. Any subsequent demands to view the retrieved globally managed task will result in delivering the local copy to avoid additional communication overhead.

The local artifacts cache 116 is typically used to store requested artifacts locally on demand. When an artifact is requested from the client, such as when the client wants to view an artifact in a displayed task model and double clicks on an artifact node, the local artifacts cache 116 checks if such artifact exists locally and if not issues a request using the artifacts client 120 to the artifacts web service 132 of the task management back-end application 128. The physical content of the artifact is delivered and stored locally in the local artifacts cache repository 124. Thereby the local artifacts cache 116 links a unique artifact identifier to the created local storage. Any subsequent demands to view the artifact will result in delivering the local copy to avoid additional communication overhead.

The local task models cache repository 122 stores the content of retrieved globally managed task models locally on the client system. The local task models cache repository 122 may be organized simply as a local file system folder, where contents of retrieved task models are written as physical files. The cache, in some embodiments, is cleared manually if update of existing models is requested. Other embodiments include automatic clearing based on a specified time to persist task models or when a change is detected in the task model as it is stored in the task repository. Other embodiments include clearing the local task model cache repository 122 when the task management front-end application 108 is terminated.

The local artifacts cache repository 124 stores artifact content locally on the client system. The local artifacts repository may be organized simply as a local file system folder, where contents of artifacts retrieved from the server are written as physical files. The cache may be cleared manually if update of existing artifacts is requested explicitly or it may be cleared automatically similarly to the local task models cache repository 122.

The task service 130 is part of the task management back-end application 130. The task service 130 is typically responsible for updating task structures on the back-end and storing them in the task repository 136. The task service 130 is also responsible for reading out task structures from the task repository 136, translating them in task models, and delivering them to the task client 118 of the task management front-end application 108.

The artifact web service 132 is typically responsible for artifacts management within the task management back-end application. The management of artifacts typically includes storing artifact contents delivered from clients in the artifacts repository 138 and for delivering artifact content and information to the artifacts client 120 on demand. Thereby the artifact web service 132 is able to distinguish and deliver different artifact versions to the client depending on the artifact names and artifact content checksums e.g. CRC32 checksums uniquely identifying the artifact content.

In some embodiments, the repository mapper 134 performs functions to associate artifacts within tasks by accessing both the task repository 136 and the artifacts repository 138. The repository mapper 134 may also be implemented as part of one or both of the artifact web service 132 and the task web service 130. The repository mapper 134 may also be responsible for writing association data in the association storage 140. The associations of artifacts to tasks result from the merge of artifact and task unique identifiers in a many to-many relation. Thereby one artifact may be used by multiple tasks and still be represented through a single entry in the artifacts repository. If a task requires an altered version of the artifact, a new artifact entry is be created for the altered artifact version and the association will be switched to the new artifact repository 138 entry.

The task repository 136 holds tasks and their contents. The task repository 136 is the central storage for task structures. The repository can be organized as file system folders. However, some embodiments are implemented utilizing a database based.

The artifacts repository 138 stores which may include one or more of artifact data, such as artifact description attributes which may include name, ID, checksum, documents, templates, and the like. The artifact repository 138 may be organized in a distributed manner across several database tables or electronic files and file folders.

The architecture of the system 100 may be used by task management applications. Such applications can transfer generated task models and need not care about particular globally managed task structure changes, artifact sizes, or storage locations. Users can compose task models by making use of globally managed reusable practices described themselves as distributed task models. Thereby the chain of globally managed task models might stretch upon various enterprise domains and the end user would not need to worry about the accuracy of a specific, nested, globally managed task model. Furthermore, an application making use of such task models allows access to the artifact content and allows modifications to artifacts in a transparent, light-weight manner.

The usage process of the architecture, one example of which is illustrated and described above with regard to FIG. 1, divides into several phases. These phases include update and retrieval of task models and update, removal, and retrieval of artifacts. An example embodiment of a task model retrieval phase is illustrated in FIG. 4 and an example embodiment of a task model update phase is illustrated in FIG. 3 Further examples of artifact update, artifact remove, and artifact retrieve phases are illustrated in FIGS. 5 (A and B), FIG. 6, and FIG. 7, respectively.

FIG. 3 is a block flow diagram of a method 300 according to an example embodiment. The method 300 is an example embodiment of updating a task model.

Task models generally describe tasks and are therewith represented as persistent task entries in the task repository on the back-end system. The globally managed task models are, as mentioned previously, nothing more than tasks, which are accessible and manageable by a specific user group. When a runtime task object is changed 302 on the front-end, the task service client generates a task update request 304, which contains a representation of the changed task attributes, such as name, due date, description, subject etc. The task update request is sent 306 to the server, where it is parsed 306. The data is accordingly updated in the task entry in the task repository 310. A new task entry is created if no entry exists yet for the task. A result status and data are returned 312 to the client. The client parses the status and data 314 and determines 316 if the update was successful. If successful, the front-end is updated 320. If the update was not successful, an error is displayed 318 via a user interface. In some embodiments, the update request is triggered asynchronously. In such embodiments, the update operation runs transparently and the front-end does not wait for the result from the server.

FIG. 4 is a block flow diagram of a method 400 according to an example embodiment. The method 400 is an example embodiment of retrieving a task model.

When a link to a globally managed task is activated in the client, such as by a user expanding a tree node of globally managed task in a task tree view, the client application checks 402 if 404 an entry for the specified task exists in the local task models cache. If a local link is found, such as a local file path to or memory address of a task description document stored on the client, the task content is retrieved from the local file 432. If no task entry is found in the local task models cache, a task query request is created 408 based on a unique task identifier, such as a task ID or a combination of task name and version. The request is then sent 410 to the server.

The server parses the request data 412 and retrieves the task data from the task repository 414. If the task model does not exist 416, an error status is returned 418 to the requesting client. If the task model does exist 416, a common task model description is created from the repository data 420 in the required mode (minimal and maximal representation as specified in the query data). Thereby if explicit inclusion of full artifacts content is required (e.g. as base64 encoded binary data in a XML), the task web service may access the artifacts web service to query artifact contents. The generated task model is returned as response data 418.

The client then parses the received query response status and data 422. If the retrieval was not successful 424, an error is displayed 426 in a user interface. However, if the operation was successful 424, the obtained task model is stored in the local task models repository 428. The local task models repository is then updated with the key to create a local task model cache entry 430 including the unique identifier of the globally managed task and the local location of the stored task model. The local task model is retrieved 432 and parsed by the client and the front end is updated. In such embodiments, subsequent requests of the content of the globally managed task model will make use of the local copy until the local task models cache is cleared.

Note that the task model local cache is optional and targets enhanced performance. If the cache is omitted, the local cache is not checked 402. A query will be created 408 and sent 410 each time the task model is requested. The content retrieved from the server thus is not stored locally either and the store in task models repository 428 and create local task models cache entry are omitted. Further, the local task model will not be retrieved, but the content instead delivered from the server.

FIG. 5A is a block flow diagram of a first portion of a method 500 according to an example embodiment. FIG. 5B is a block flow diagram of a second portion of the method 500 of FIG. 5A according to an example embodiment. The example method 500 is an embodiment of an artifact update process. The portions of the method 500 illustrated in FIG. 5A are performed within a client layer of a system implementing the method 500. The portions of the method 500 illustrated in FIG. 5B are performed within a server layer of a system implementing the method 500.

With reference to FIG. 5A, when changes to a task object are made on the front-end, first the task is updated 502. Updating the task 502 may include adding of a new task entry in the task item repository. An example method of updating a task is illustrated in FIG. 3. If the task update 502 is not successful, an error is displayed in a user interface 506. If the task update 502 is successful 504, a loop is executed for all physical attachments in the task object 508. The application makes use of the contained artifact object references to check if the physical attachment is already described with an artifact reference within the task object 510. This may be performed, for example, when the artifact objects contain a checksum attribute serving for unique identification of the artifact content (bytes) e.g. as a CRC32 checksum, and such a sum is also calculated for the physical content of attachments with the same name as the name attribute stored in the artifact object. If the attachment is not represented within the task object through an appropriate artifact object reference, the artifact web service client creates 512 and sends 514 an artifact update request, which may also include all content (bytes) of the appropriate attachment.

Referring now to FIG. 5B, the request is parsed 516 on the server and a check sum is built for the received content 518. Existing artifacts on the server are then checked 520 to see if the artifact already exists on the server. If the artifact does not exist, the artifact is saved in the artifacts repository 524. If the artifact does exist, the artifact is fetched from the data source 526 where it is stored. In either case, the artifact is then associated with the updated task 502. The server then returns status and data 530 to the client.

Returning to FIG. 5A, the client then parses the received status and data. If that status indicates a failure on the server, an error is displayed via a user interface 536. If the status indicates success, 534, the method 500 concludes by adding an artifact object reference to the task 538.

In some embodiments, the check for existing artifacts 520 is also performed on the client side. This is performed in embodiments where the client side includes one or both of a local artifacts cache and a local artifacts cache repository. These checks help prevent creation of duplicate artifacts.

Figure 6:
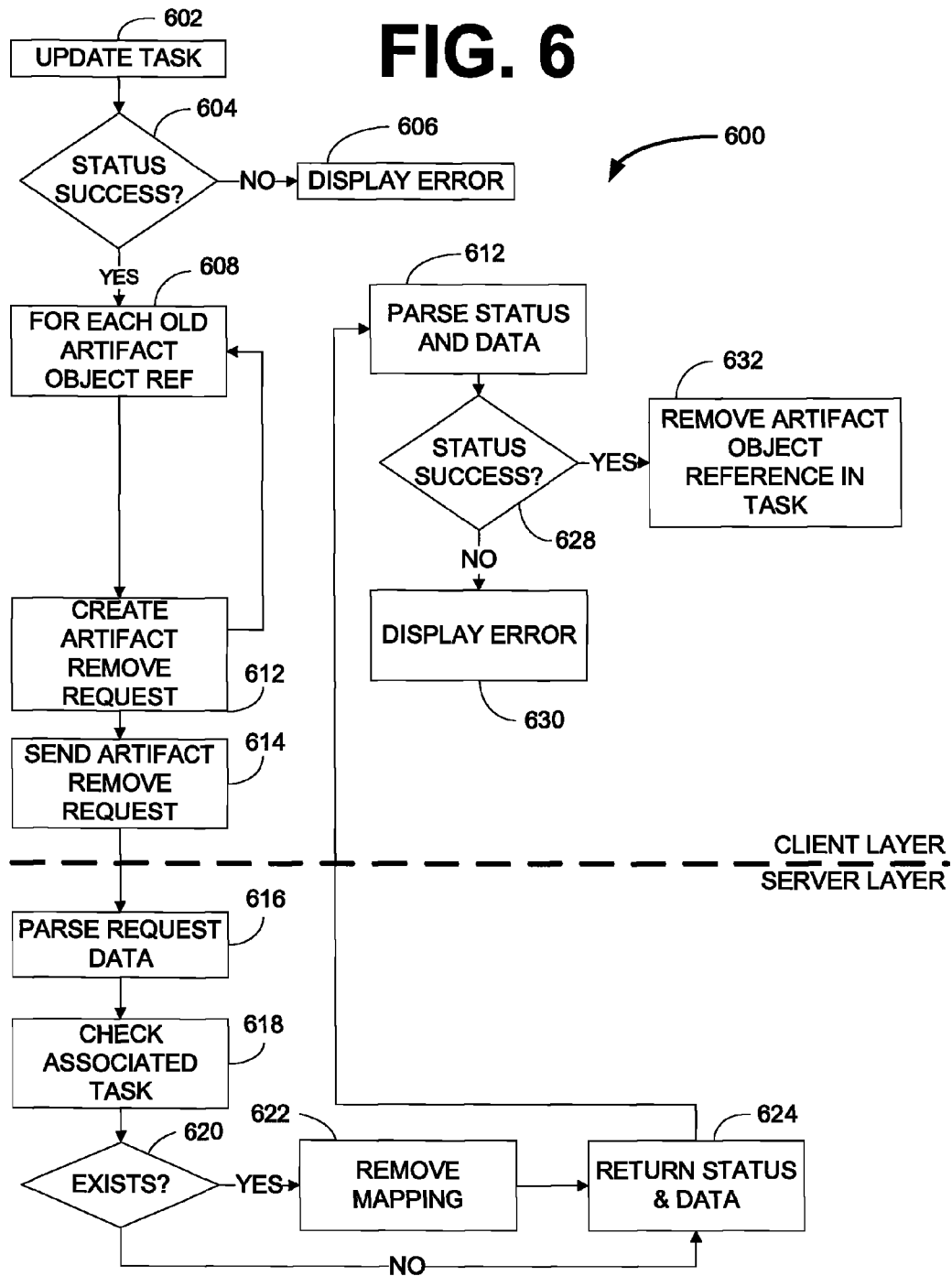
FIG. 6 is a block flow diagram of a method according to an example embodiment.

FIG. 6 is a block flow diagram of a method 600 according to an example embodiment. The method 600 is an example embodiment of removing an artifact from a system, such as the system 100 of FIG. 1. The method 600 has the purpose to simply remove the association of a particular artifact to a task if the corresponding attachment has been removed from the task on the front-end. When a change to a task object on the front-end is detected and the application has updated the artifacts for all contained attachments, the application checks if some of the previously contained artifact object references no more correspond to contained attachments. If so, the client triggers a remove request to the back-end, by simply passing the ID of the no longer used artifact reference object and the task ID for the currently modified task. The repository mapper on the back-end queries the artifact entry from the artifact repository for the given artifact ID and removes its association for the given task ID.

In some such embodiments, the example method 600 includes updating a task 602 to remove an association to an artifact. If the task update 602 is not successful, a error message is displayed 606 via a user interface. If the task update 602 is successful, the method 600 iterates for each removed artifact reference 608 to create an artifact remove request 612. The artifact remove request is then sent to the server 614.

The server ten parses the request data 616 and checks for tasks associated artifact remove request 618. If the artifact references exist, the references are removed from the mappings 622. If the artifact references do not exist 620 or after they have all been removed from the mappings 622, the server returns status and data 624 to the client.

The client then parses the status and data 612 to determine 628 if the artifact removed request was fulfilled by the server. If not, an error is displayed 630 via a user interface. If so, artifact object references in task on the client are removed 632.

Figure 7:
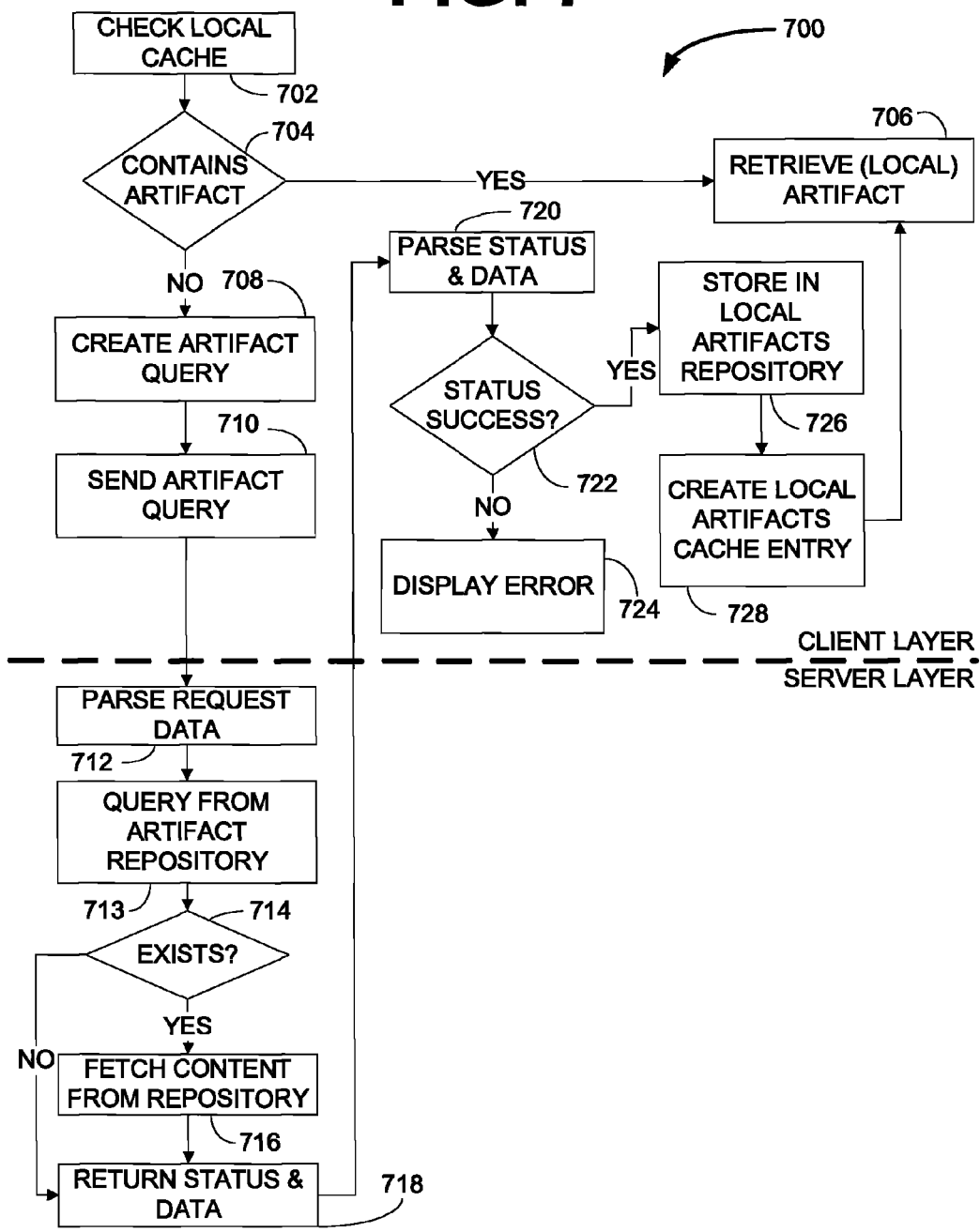
FIG. 7 is a block flow diagram of a method according to an example embodiment.

FIG. 7 is a block flow diagram of a method 700 according to an example embodiment. The method 600 is an example embodiment of retrieving artifacts.

In some such embodiments, the client application first uses the artifacts local cache to check if a local copy of the given artifact is stored in a local artifacts cache 702. If such an entry is contained 704, the local artifact content is retrieved 706. If no local artifact entry is found, the artifacts service client creates an artifact query request 708 and sends it to the artifacts web service 710. The server parses the request data 712 and queries the artifact from the repository 713. If an artifact entry exists 714, the application reads out the artifact content from the repository 716 and returns it with the response 718. The client parses the response status and data 720. If the status is negative 722, the client displays an error message 724. However, if success 722 is detected, the client creates a local artifacts repository entry for the queried artifact 726. A local artifacts cache entry is also created 728 in the front-end application. The artifact content is ten retrieved from the local storage 706.

Note that the local artifacts cache is optional and targets performance optimizations. If the caching is missing, the checking of the local cache 702 is omitted and artifact queries would be created for each artifact request. Further, the Storing in local artifacts repository 726 and creating local artifacts cache entry 728 is also omitted and no local content will be retrieved 706. In such embodiments, the requested artifact contents will be delivered each time with the artifacts.

Figure 8:
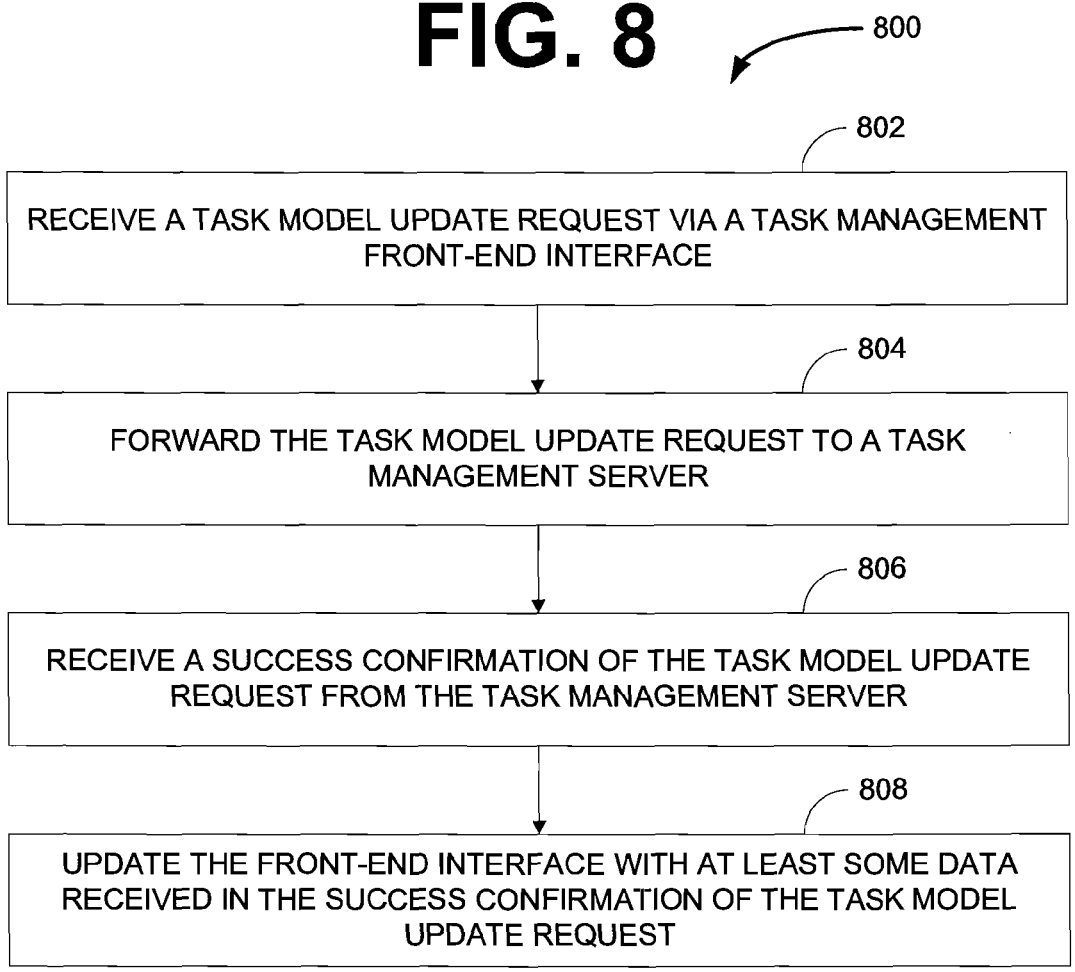
FIG. 8 is a block flow diagram of a method according to an example embodiment.

FIG. 8 is a block flow diagram of a method 800 according to an example embodiment. The example method 800 includes receiving a task model update request via a task management front-end interface 802, forwarding the task model update request to a task management server 804, and receiving a success confirmation of the task model update request from the task management server 806. The method 800 may further include updating the front-end interface with at least some data received in the success confirmation of the task model update request 808.

In some embodiments of the method 800, the task management front-end interface is an interface within a groupware client application including one or more displayable user interfaces. The groupware client may be virtually any groupware client allowing for one or both of scheduling and task definitions. In some embodiments, the groupware client is Microsoft Outlook.

Figure 9:
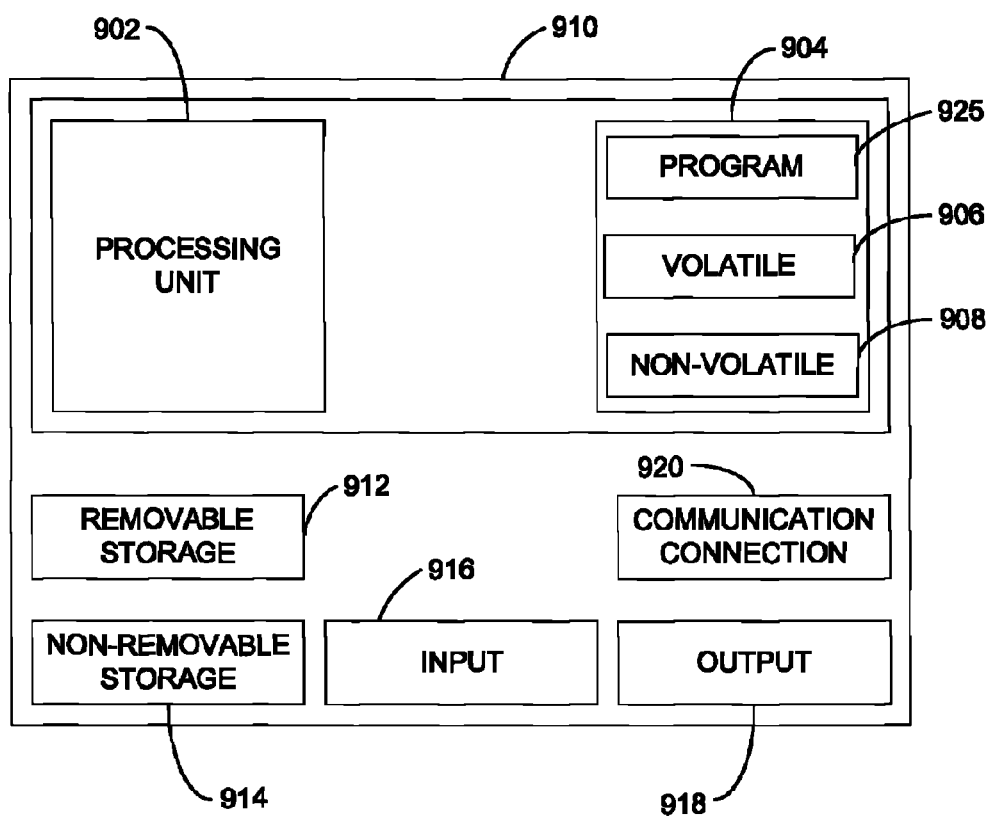
FIG. 9 is a block diagram of a system according to an example embodiment.

FIG. 9 is a block diagram of a computing device according to an example embodiment. In one embodiment, multiple such computer systems are utilized in a distributed network to implement multiple components in a transaction based environment. For example, one computer system may be a server and one or more other computer systems may be clients. An object oriented architecture may be used to implement such functions and communicate between the multiple systems and components. One example computing device, in the form of a computer 910, may include a processing unit 902, memory 904, removable storage 912, and non-removable storage 914. Memory 904 may include volatile memory 906 and non-volatile memory 908. Computer 910 may include—or have access to a computing environment that includes—a variety of computer-readable media, such as volatile memory 906 and non-volatile memory 908, removable storage 912 and non-removable storage 914. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 910 may include or have access to a computing environment that includes input 916, output 918, and a communication connection 920. The computer may operate in a networked environment using a communication connection to connect to one or more remote computers, such as database servers. The remote computer may include a personal computer (PC), server, router, network PC, a peer device or other common network node, or the like. The communication connection may include one or more of a Local Area Network (LAN), a Wide Area Network (WAN), a global computing network, and one or more other networks.

Computer-readable instructions stored on a computer-readable medium are executable by the processing unit 902 of the computer 910. A hard drive, CD-ROM, and RAM are some examples of articles including a computer-readable medium. For example, a computer program 925 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 910 to provide generic access controls in a COM based computer network system having multiple users and servers. In some embodiments, the computer program 925 may include a groupware application and an application implementing one or more of the methods described herein.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A method comprising:
receiving a task model update request to update a task model via a task management front-end interface of a groupware application installed locally to a computing device performing the method, the task model update request including an artifact update request with regard to an artifact determined to be updated, the artifact being an electronic file to be stored in an artifact repository in association with the task model to be updated;
on the computing device performing the method:
calculating a checksum based on the artifact of the artifact update request;
based on the checksum and contents of a local task model cache stored on the computing device, determine if the artifact of the artifact update request as updated is already present in the task model of the task model update request;
when the artifact of the artifact update request as updated is determined as not already present in the task model:
sending the artifact update request to a task management server; and
receiving a success confirmation of the artifact update request;
updating the task management front-end interface with at least some data received in the success confirmation of the task model update request;
when the artifact update request is sent to the task management server and the success confirmation is received with regard to the artifact update request, updating the task management front-end interface to include a mapping of the artifact of the artifact update request to the task model; and
storing a representation of the task model of the task model update request in the local task model cache.

2. The method of claim 1, wherein the task model update request is sent to the task management server via a web service call.

3. The method of claim 1, wherein storing the representation of the task model in the local task model cache includes storing the task model representation in a persistent task model cache repository.

4. The method of claim 1, wherein a first task model includes one or more subtasks.

5. The method of claim 4, wherein the one or more subtasks each include a standalone task model associated to the first task by a reference to each subtask task model within the first task model.

6. The method of claim 1, wherein the association of an artifact with one or more task models is a stored mapping of the artifact to each of the one or more task models.

7. A system comprising:
a processor coupled to a memory device;
a task management front-end module stored in the memory device and executable by the processor to provide data processing services and user interfaces within a groupware application including:
a user interface client to allow human interaction;
a task client to provide task model data services to the user interface client;
an artifact client to provide artifact data services to the user interface client, the artifact data services including a service to determine if an updated artifact as updated is already present in an existing task model and to update the updated artifact only when the updated artifact is not already present in the existing task model;
a local task model cache to store task models retrieved from a task interface of a task management back-end module; and
a local artifact cache to store artifacts retrieved from an artifact interface of the task management back-end module;
the task management back-end module including:
the task interface to provide task model data services to the task client of the task management front-end module;
the artifact interface to provide artifact data services to the artifact client of the task management front-end module;
a task-artifact mapping interface to provide artifact mapping services related to mappings of artifacts to task models; and
a task model repository to store task models;
wherein the artifact data services of the artifact client includes a service to:
calculate a checksum based on an artifact of an artifact update request;
based on the checksum and contents of the local task model cache, determine if the artifact of the artifact update request as updated is already present in a task model of the task model update request;
when the artifact of the artifact update request as updated is determined as not already present in the task model:
send the artifact update request to the task interface; and
receive a success confirmation of the artifact update request;
update the user interface client with at least some data received in the success confirmation of the task model update request;
when the artifact update request is sent to the task interface and the success confirmation is received with regard to the artifact update request, updating the user interface to include a mapping of the artifact of the artifact update request to the task model; and
store a representation of the task model of the task model update request in the local task model cache.

8. The system of claim 7, further comprising:
an artifacts repository to store artifact data; and
a task-artifact mapping repository to store associations of artifacts stored in the artifact repository to task models stored in the task model repository.

9. The system of claim 8, wherein:
the task interface is operable to store and retrieve task models to and from the task repository in response to requests from the task client; and
the artifact interface is operable to store and retrieve artifacts to and from the artifact repository in response to requests from the artifact client.

10. The system of claim 7, wherein one or both of the local task model cache and the local artifact cache are located on a non-volatile memory device.

11. The system of claim 7, wherein one or more of the task interface, the artifact interface, and the task-artifact mapping interface are web services available to the task management front-end module over a network.

* * * * *